United States Patent [19]

Sugawara

[11] Patent Number: 4,527,881
[45] Date of Patent: Jul. 9, 1985

[54] PHOTOMETRIC DEVICE

[75] Inventor: Saburo Sugawara, Tokyo, Japan

[73] Assignee: Asahi Kogaku Kogyo Kabushiki Kaisha, Tokyo, Japan

[21] Appl. No.: 626,076

[22] Filed: Jun. 29, 1984

[30] Foreign Application Priority Data

Jul. 29, 1983 [JP] Japan .................. 58-138763

[51] Int. Cl.³ .................. G03B 7/28; G03B 7/08
[52] U.S. Cl. .................. 354/432
[58] Field of Search .......... 354/21, 410, 429, 431, 354/432; 356/221, 222, 226; 250/214 P

[56] References Cited

U.S. PATENT DOCUMENTS

| | | | |
|---|---|---|---|
| 4,176,955 | 12/1979 | Yamada et al. | 356/222 |
| 4,182,573 | 1/1980 | Yamada et al. | 356/222 |
| 4,309,089 | 1/1982 | Harvey | 354/21 |
| 4,397,553 | 8/1983 | Yuasa et al. | 356/222 |
| 4,412,730 | 4/1984 | Saegusa et al. | 354/410 |
| 4,443,080 | 4/1984 | Saegusa | 354/432 |
| 4,445,778 | 5/1984 | Nakauchi | 354/432 |
| 4,476,383 | 10/1984 | Fukuhara et al. | 354/432 X |

Primary Examiner—William B. Perkey
Attorney, Agent, or Firm—Sughrue, Mion, Zinn, Macpeak and Seas

[57] ABSTRACT

A photometric device in which the photographic field is divided into a plurality of photometric regions, photometric outputs are obtained from each region, the difference between the maximum and minimum values among the photometric outputs is compared with the latitude of the film being used, and one of a highlight reference exposure, average exposure and shadow exposure is selected according to the results of the comparison operation. Accordingly, the available latitude of the film being used is employed maximally.

4 Claims, 4 Drawing Figures

PHOTOMETRIC DEVICE

BACKGROUND OF THE INVENTION

The present invention relates to photometric devices, and more particularly, to a photometric device in which a photographic field is divided into a plurality of regions for a photometric operation, and a plurality of photoelectric outputs obtained from the various regions and the latitude data of the film being used are utilized to obtain the correct exposure output for the entire image. (As used herein, the "latitude" of a photographic film or the like means the range of brightness over which the film is responsive.)

In general, single-lens reflex cameras employ a photometric system in which mainly the brightness of an object at the center of the photographic field is sensed. However, this photometric system sometimes suffers from the drawback that it is difficult to obtain correct exposure values for objects of large contrast or objects of variable contrast. For instance, a photometric operation employed in the case where a person on a stage is spotlighted but the background is dark should be different from a photometric operation in the case where the person and the background are uniformly illuminated. The conventional photometric system can provide a correct exposure value in the latter case but not in the former. In such situations, and where the range of brightness of the object is smaller than the photometric range, the photographer must generally determine the exposure value by intuition and cannot determine the correct exposure value without using a spot photometer. The same difficulties occur in the case also where the object is not located at the center in taking pictures against a bright background.

SUMMARY OF THE INVENTION

Accordingly, an object of the invention is to provide a photometric device in which the above-described difficulties accompanying a conventional photometric device have been eliminated, and in which the photographer can select a suitable photographing mode according to the contrast of an object.

The foregoing object of the invention has been achieved by the provision of a photometric device in which, according to the invention, the photographic field is divided into a plurality of photometric regions and photometric outputs are obtained from each region, the difference between the maximum and minimum values among the photometric outputs is compared with the latitude of the film being used, and one of a highlight reference exposure, average exposure and shadow exposure is selected according to the results of the comparison so that the film's latitude is utilized maximally.

DESCRIPTION OF THE PREFERRED EMBODIMENTS

Figure 1:
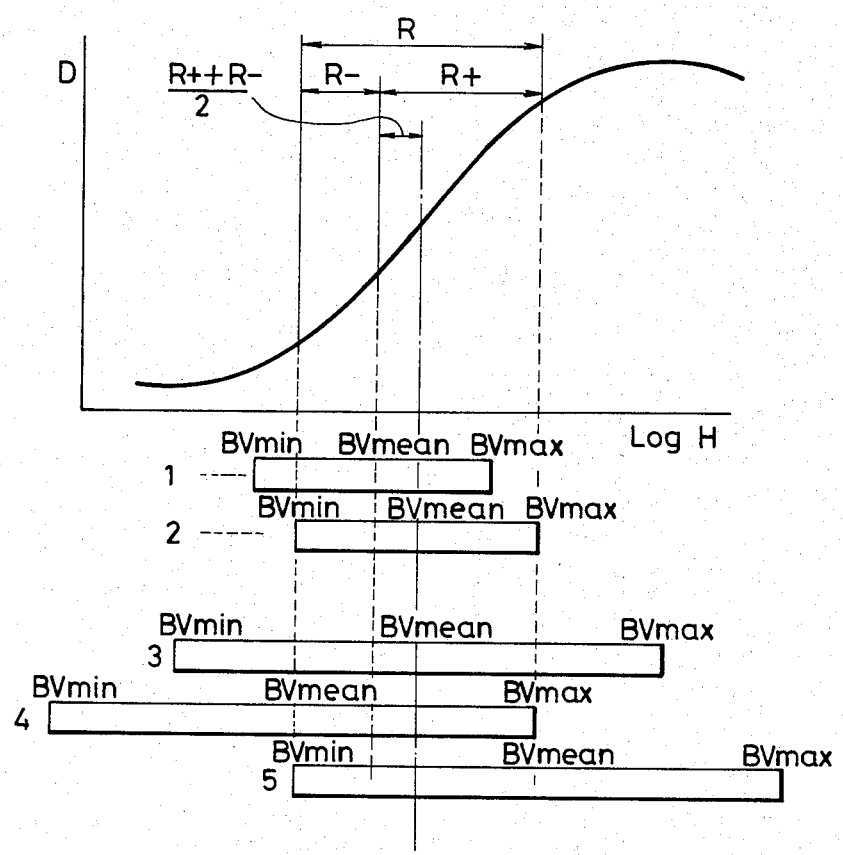
FIG. 1 is a graphical representation used for a description of the principles of the invention.

First, the basic principles of the invention will be described with reference to FIG. 1. FIG. 1 is a graphical representation indicating relationships between the characteristic curve of a photographic film (or other photosensitive material) and the ranges of brightness of objects. In FIG. 1, the vertical axis represents the logarithm, log H, of exposure values H. The bar graphs 1 through 5 indicate the ranges of brightness of various objects. In the bar graphs 1 and 2, the range of brightness of the object is substantially equal to he latitude R of the film. In the bar graphs 3, 4 and 5, the range of brightness of the object is larger than the latitude R of the film. In these bar graphs, reference character $BV_{max}$ designates the maximum value of brightness, $BV_{mean}$ the mean value of brightness, and $BV_{min}$ the minimum value of brightness. In FIG. 1, reference character R+ designates a latitude on the positive side, and R− a latitude on the negative side. Thus, in the bar graphs 1 and 2, the range of brightness ($BV_{max}-BV_{min}$) is equal to the latitude R.

In a conventional photometric system, sometimes it is difficult to effectively utilize the latitude of a film depending on the distribution of brightness in the object, with the result that reproduction cannot be achieved correctly. That is, when the range of brightness is equal to the latitude R as in the case of the bar graph 2, reproduction will be correct; however, when the absolute value of the latitude R+ on the positive side is not equal to that of the latitude R− on the negative side as in the bar graph 1, the reference point $BV_{mean}$ of exposure does not coincide with the center of the characteristic curve. In other words, when the absolute value of the latitude R+ on the positive side is larger than that of the latitude R− on the negative side as illustrated, the reference point $BV_{mean}$ of exposure is located to the left below the center of the linear part of the characteristic curve. Accordingly, the brightness of shadow parts of the image is outside of the latitude R, and correct reproduction cannot be obtained. In the case of the bar graph 1, or in the case where the brightness of a highlighted part of the image is outside of the latitude R, the conventional photometric system cannot perform adequately. However, if a correction is effected by shifting the range of brightness by half the sum of the latitudes +R and −R so that the reference point $BV_{mean}$ of exposure coincides with the center of the characteristic curve, i.e., if the range of brightness is made equal to the latitude R as in the bar graph 2, then the latitude of the film can be utilized maximally.

When the range of brightness ($BV_{max}-BV_{min}$) of an object is much larger than the latitude R of the film as in the bar graph 3, the above-described correction will not work; both the highlighted parts and the shadow parts are outside of the latitude R, and hence all parts of the image cannot be correctly reproduced. If, in this case, a main portion of the object is inside of the range of intermediate brightness (near $BV_{mean}$), then there is no difficulty. However, if the main part of the object is in the highlighted or shadow part, correct reproduction thereof cannot be achieved. Therefore, in this case, it is necessary to change the reference of exposure. That is, when the main part of the object is in the highlighted area, correction should be so made that, as shown by the bar graph 4, the maximum brightness $BV_{max}$ coincides with the right end of the linear part of the latitude R; more specifically, the exposure should be corrected so that the area of maximum brightness is subjected to overexposure by $(R+)EV$.

When the main part of the object is in the shadow area, correction should be made so that, as shown by the bar graph 5, the minimum brightness $BV_{min}$ coincides with the left end of the linear part of the latitude R of the film; more specifically, the exposure should be corrected so that the minimum brightness part is subjected to underexposure by $(R-)EV$.

Figure 2:
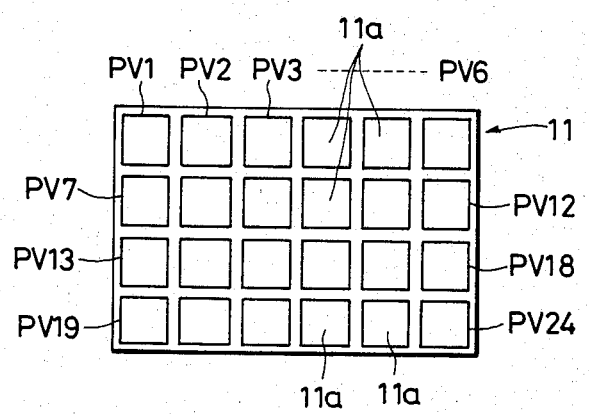
FIG. 2 is a plan view showing an example of a light-sensing element used in a photometric device according to the invention.
Figure 3:
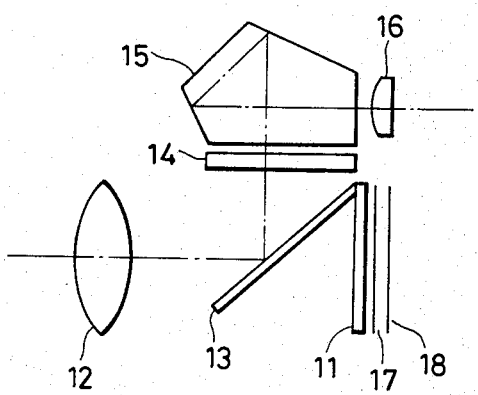
FIG. 3 is an explanatory diagram depicting the optical system of a camera with the light-sensing element shown in FIG. 2.
Figure 4:
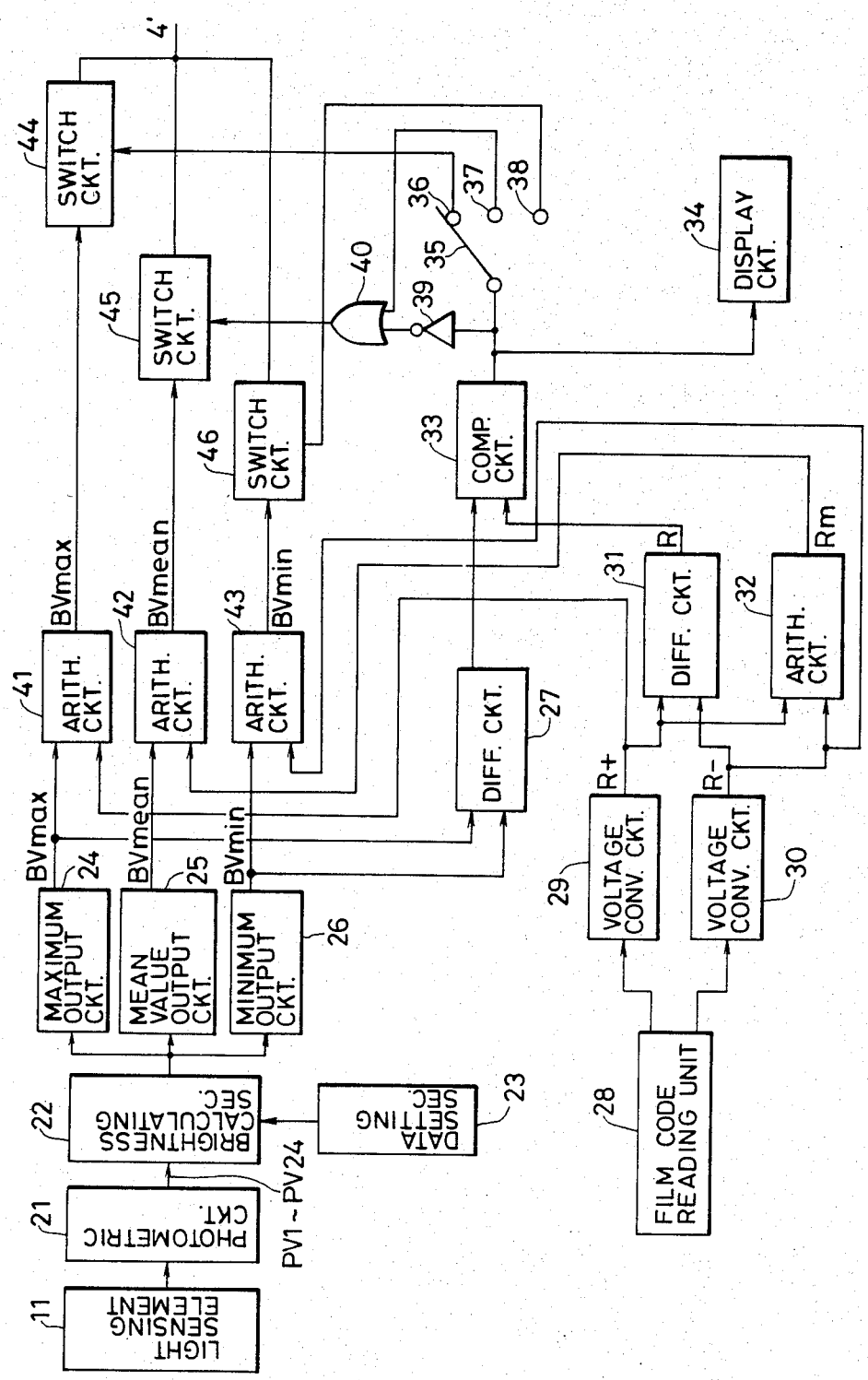
FIG. 4 is a block diagram showing an example of a photometric device constructed according to the invention.

As is apparent from the above description, by carrying out average exposure (bar graph 1), highlight reference exposure (bar graph 4) or shadow reference exposure according to the range of brightness of the object, a correct exposure can be obtained at all times. In these cases, the brightness values applied to the exposure control system should be as follows:

Average exposure: $BV_{mean} - \{(R+)+(R-)\}/2$
Highlight reference exposure: $BV_{max} - (R+)$
Shadow reference exposure: $BV_{min} - (R-)$ FIGS. 2, 3 and 4 depict a preferred embodiment of a photometric device of the invention which is based on the above-described principles. As is clear from the discussion above, it is essential that the brightness of a field be subdivided maximally for measurement. For this purpose, as shown in FIG. 2, a photodiode array or a two-dimensional image sensor of, for instance, CCDs is used as a light-sensing element 11. In the case of FIG. 2, the field is divided into a matrix of $6 \times 4 = 24$ photometric regions and the brightness values of the photometric regions are each measured independently of one another. In FIG. 2, 11a designates photometric elements, each of which defines a corresponding photometric region.

FIG. 3 shows the optical system of single-lens reflex camera with the above-described light-sensing element 11. The light-sensing element 11 is arranged immediately before the focal plane shutter 17, the latter being located in front of the film surface 18, and arranged perpendicular to the optical axis. Light from the object is conveyed by means of the lens 12, the half-silvered mirror 13, the screen 14, the pentaprism 15 and the eyepiece 16 to the photographer's eye. On the other hand, the light passing through the half-silvered mirror 13 is applied to the light-sensing element 11 with which the light from various portions of the object is measured by photometric regions arranged in matrix form as described above. The light-sensing element operates in association with the half-silvered mirror 13. More specifically, in a photographing operation, the light-sensing element 11 is retracted from the photographing optical path in association with the retraction of the half-silvered mirror 13. A variety of interlocking mechanisms capable of performing this function are well known in the art for use with other photometric elements, and the specific structure of the retracting mechanism is not essential for the invention.

FIG. 4 is a block diagram showing an example of a circuit used for effecting average exposure, highlight reference exposure or shadow reference exposure (described with reference to FIG. 2) in response to the outputs of the photometric elements 11a of the light-sensing element 11. As shown in FIG. 4, a photometric circuit 21 receives the outputs of the photometric elements 11a of the light-sensing element 11 and in response produces TTL-level full-aperture outputs $PV_1$ through $PV_{24}$. These outputs are smaller by the full-aperture value $AV_0$ (apex value) of the lens 12 than the brightness values $BV_1$ through $BV_{24}$ (apex values) of the twenty-four parts of the image corresponding to the twenty-four elements 11a. That is, the outputs are as follows:

$$PV_1 = BV_1 - AV_0$$
$$PV_2 = BV_2 - AV_0$$
$$\vdots$$
$$PV_{24} = BV_{24} - AV_0$$

In a brightness calculating section 22, the photometric outputs $PV_j = BV_j - AV_0$ (where $j=1$ to 24) from the photometric circuit 21 are added to the full-aperture value $AV_0$ of the lens 12 provided by a data setting section 23 to obtain absolute brightness values $BV_j$. A maximum output circuit 24 operates to output the maximum value $BV_{max}$ among the absolute brightness values $BV_j$. A mean value output circuit 25 outputs the mean value $BV_{mean}$ of the absolute brightness values $BV_j$. A minimum output circuit 26 outputs the minimum value $BV_{min}$ among the absolute brightness values $BV_j$. A differential circuit 27 outputs the difference $dBV$ between the maximum value $BV_{max}$ and the minimum value $BV_{min}$.

The circuit in FIG. 4 further includes a film code reading unit 28 adapted to read the latitude data of the film loaded into the camera. The film code reading unit 28 outputs latitude data on both the positive and negative sides. The latitude data values provided by the film code reading unit 28 are converted into voltages by voltage conversion circuits 29 and 30. The voltage conversion circuit 29 outputs a latitude $R+$ on the positive side, and the voltage conversion circuit 30 a latitude $R-$ on the negative side. The latitudes $R+$ and $R-$ are applied to a differential circuit 31 which outputs a signal representing the difference between the latitudes $R+$ and $R-$, that is, the latitude R of the film is outputted by the differential circuit 31. The latitudes $R+$ and $R-$ are further applied to an arithmetic circuit 32, which in response produces a signal representing a half Rm of the sum of the latitudes $R+$ and $R-$. The difference $dBV$ between the maximum value $BV_{max}$ and the minimum value $BV_{min}$ is compared with the latitude R of the film by a comparison circuit 33. When $dBV$ is larger than R, the comparison circuit 33 outputs a "1". When the signal "1" is applied to a display device 34, the latter provides a warning indication, for instance, a message "SELECT EXPOSURE MODE". In FIG. 2, reference numeral 35 designates a photographing mode select switch with a "highlight" terminal 36, an "average" terminal 37 and a "shadow" terminal 38; 39, an inverter, and 40, an OR gate.

The photometric device of the invention further includes arithmetic circuits 41, 42 and 43. The arithmetic circuit 41 receives the outputs of the maximum value output circuit 24 and the voltage conversion circuit 29 and in response provides an output $BV_{max}'$ obtained by subtracting the latitude $R+$ from the maximum value $BV_{max}$. The arithmetic circuit 42 receives the outputs of the mean value output circuit 25 and the arithmetic circuit 32 to provide an output $BV_{mean}'$ which is obtained by subtracting the half Rm of the sum of the latitudes $R+$ and $R-$ from the mean value $BV_{mean}$.

The arithmetic circuit 43, receiving the outputs of the minimum value output circuit 26 and the voltage conversion circuit 30, provides an output $BV_{min}'$ obtained by subtracting the latitude R− from the minimum value $BV_{min}$. These outputs $BV_{max}'$, $BV_{mean}'$ and $BV_{min}'$ are photometric values indicative of the average exposure, highlight reference exposure and shadow reference exposure, respectively, described with reference to FIG. 1.

Switch circuits 44, 45 and 46 operate to apply one of the outputs $BV_{max}'$, $BV_{mean}'$ and $BV_{min}'$ according to an output of the comparison circuit 33 and the setting of the exposure mode select switch 35.

The operation of the photometric device will be described.

(1) dBV>R

As is apparent from the above description, in this case, the range of brightness of the object is larger than the film's latitude R, and hence it is necessary to change the exposure mode. Therefore, the comparison circuit 33 outputs the signal "1", so that, for instance, an instruction "SELECT EXPOSURE MODE" is displayed in the viewfinder by the display device 34. In this case, the photographer determines whether the main part of the object is in the range of high brightness, in the range of intermediate brightness, or in the range of low brightness, and accordingly operates the exposure mode select switch 35 to select an exposure mode according to the state of the main part of the object. The highlight mode is selected when the armature of the exposure mode select switch 35 is set to the "highlight" terminal 36, the average mode is selected when the armature is set to the "average" terminal 37, and the shadow mode is selected when the armature is set to the "shadow" terminal 38.

In the highlight mode where the armature of the switch 35 is set to the "highlight" terminal 36 as described above, the signal "1" is applied only to the switch circuit 44. As a result, the switch circuit 44 is turned on and the output $BV_{max}'$ ($BV_{max}-R+$) of the arithmetic circuit 41 is applied to the output terminal 47.

In the average mode, the armature of the switch 35 is set to the "average" terminal 37 so that the signal "1" is applied to one of the input terminals of the OR gate 40, as a result of which the OR gate 40 outputs a signal "1" and only the switch circuit 45 is turned on. Therefore, the output $BV_{mean}'$ ($BV_{mean}-Rm$) of the arithmetic circuit 42 is provided at the output terminal 47.

When the shadow mode is selected, the armature of the exposure mode select switch 35 is set to the "shadow" terminal 38. Therefore, the signal "1" is applied only to the switch circuit 36 to turn on the latter. As a result, the output $BV_{min}'$ ($BV_{min}-R-$) of the arithmetic circuit 43 is supplied to the output terminal 47.

(2) dBV≦R

In this case, the range of brightness of the object is smaller than the latitude R, and thus the average mode should be selected for exposure. That is, in this case, the comparison circuit outputs a signal "0", and therefore the inverter 39 applies the signal "1" to the OR gate 40. Thus, the OR gate 40 outputs a signal "1" so that only the switch circuit 45 is turned on. The output $BV_{mean}'$ ($BV_{mean}-Rm$) of the arithmetic circuit 42 is thus supplied to the output terminal 47.

The brightness output thus selected is applied to a conventional apex calculating circuit, where it is utilized together with other exposure factors to compute a correct exposure value. The correct exposure value is supplied to an exposure control circuit and a display circuit with which automatic exposure control and display are carried out. Thus, the photographing operation is always performed under optimum conditions.

As is apparent from the above description, according to the invention, a suitable exposure mode is selected according to the difference between the maximum and minimum of the photometric outputs obtained with the field divided into a plurality of parts and to the latitude of a photographing film. Thus, the photometric device according to the invention permits the photographer to readily select the brightness value from which the exposure value should be determined.

I claim:

1. A photometric device, comprising:
a light-sensing element for providing independent photometric outputs from a plurality of field regions which form a photographic field;
means for producing signals representing a mean value, a maximum value and a minimum value of the photometric outputs of said light-sensing element;
a reading unit for reading a latitude of a photosensitive material;
comparison circuit means for comparing a difference value between said maximum and minimum values of said photometric outputs with said latitude; and
exposure mode select switch means for selecting one of said photometric outputs as a photometric reference according to a result of comparison between said difference value between said maximum and minimum values and said latitude.

2. The photometric device as claimed in claim 1, wherein said exposure mode select switch means comprises a switch for selecting an average mode in which a photometric value is determined with said mean value of said photometric outputs as a reference value, a highlight mode in which a photometric value is determined with said maximum value of said photometric outputs as a reference value, and a shadow mode in which a photometric value is determined with said minimum value of said photometric outputs as a reference value, wherein, when said difference value between said maximum and minimum values of said photometric outputs is smaller than or equal to said latitude, said average mode is selected, and when said difference value is larger than said latitude, one of said average mode, highlight mode and shadow mode is selected.

3. The photometric device as claimed in claim 2, wherein said photometric value determined with said mean value of said photometric outputs as said reference value is an output which is obtained by subtracting a half of the sum of a latitude on a positive side and a latitude on a negative side from said mean value, said photometric value determined with said maximum value as said reference value is an output which is obtained by subtracting said latitude on said positive side from said maximum value, and said photometric value determined with said minimum value as said reference value is an output which is obtained by subtracting said latitude on said negative side from said minimum value.

4. The photometric device as claimed in claim 1, further comprising: display means for producing a warning indication when said difference value between said maximum and minimum values of said photometric outputs is larger than said latitude.

* * * * *